July 27, 1937.　　　I. F. HENSLER　　　2,088,058
TELLTALE FOR FUEL TANKS
Filed June 7, 1935　　　2 Sheets-Sheet 1
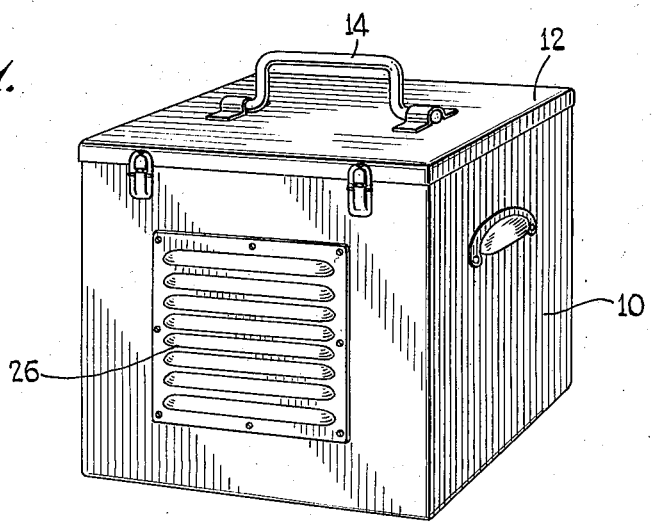
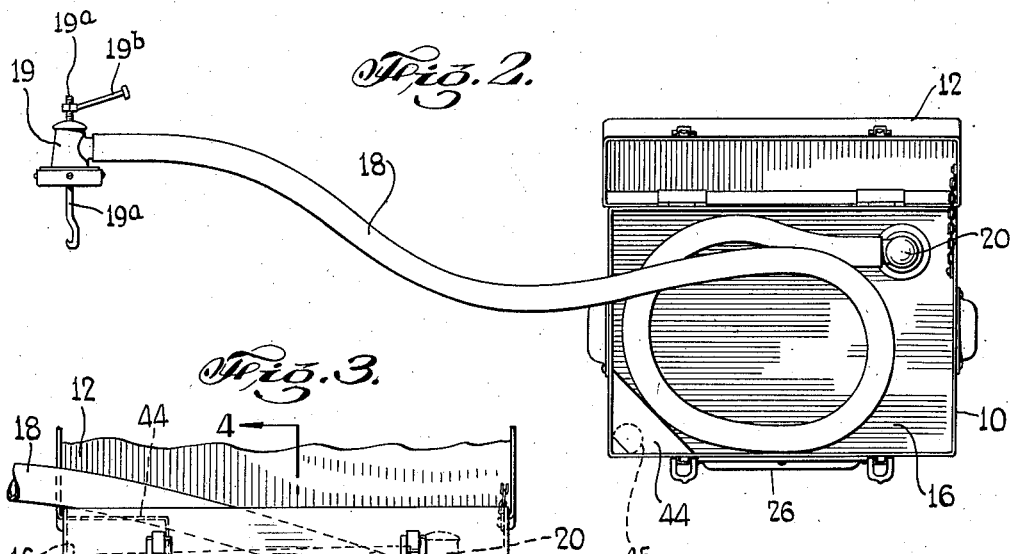
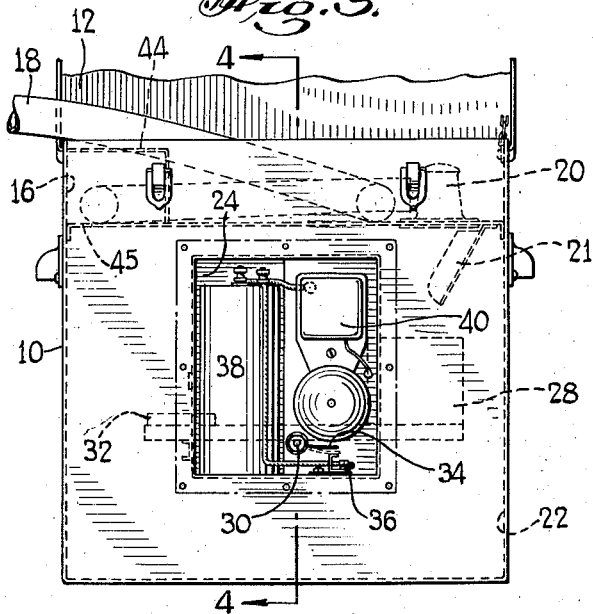
INVENTOR
Ivor F. Hensler
BY
ATTORNEYS

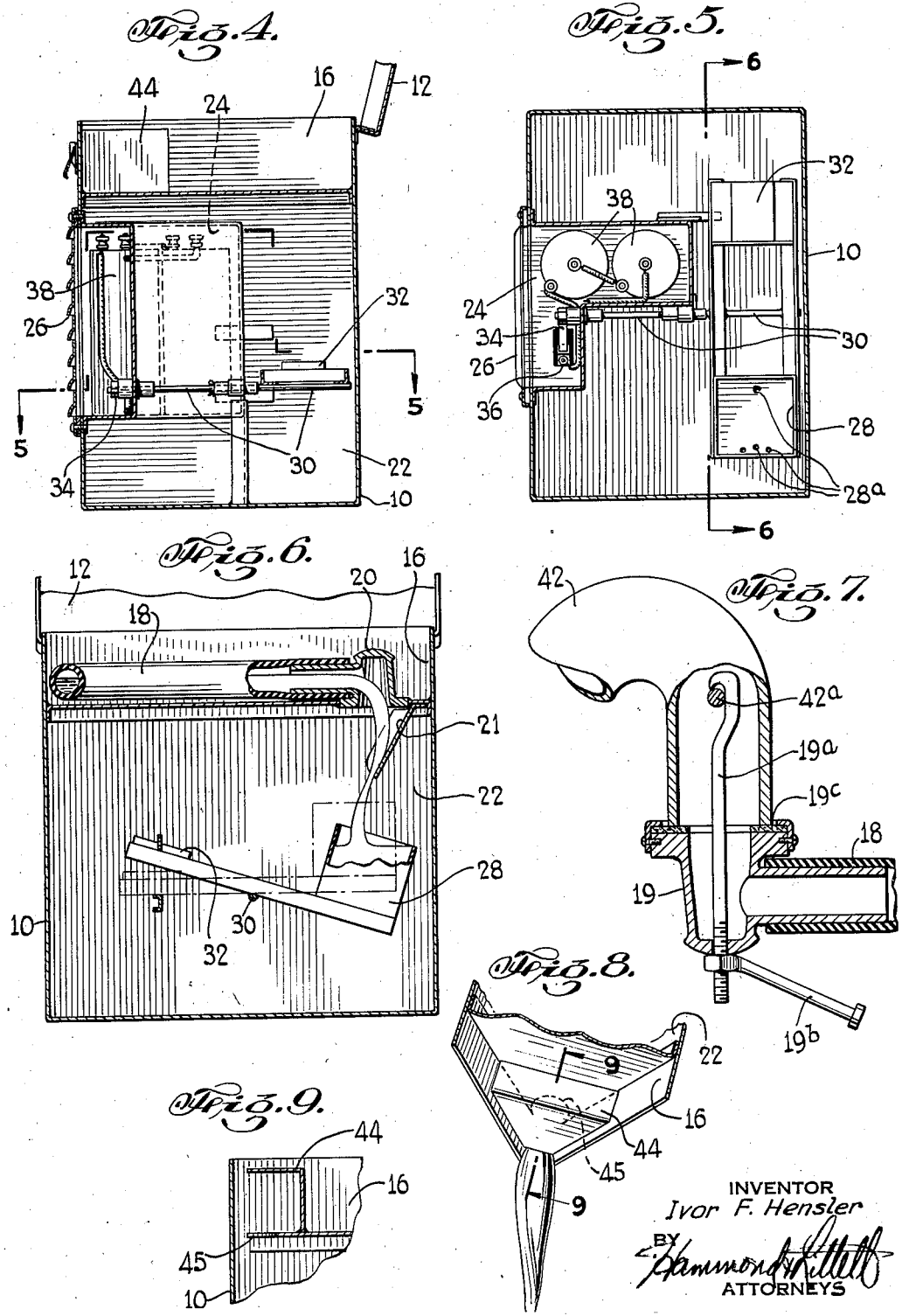

Patented July 27, 1937

2,088,058

UNITED STATES PATENT OFFICE 2,088,058

TELLTALE FOR FUEL TANKS

Ivor Francis Hensler, Roosevelt, N. Y.

Application June 7, 1935, Serial No. 25,373

7 Claims. (Cl. 177—311)

This invention relates to improvements in a portable telltale or overflow detector for warning of the overflow of liquid receptacles, and more particularly, it is adapted to prevent objectionable overflow when filling domestic fuel tanks from a supply truck.

In the filling of fuel tanks, as heretofore practiced, the fuel oil was usually pumped from the truck tank to the receiving tank through a hose and, especially where the truck was unable to come close to the tank, the hose might be of some considerable length. Often, through error of ordering too much oil or with erroneous gauges, too much oil is sought to be placed in the tank and, without warning to the operator, the tank overflows. With pressure operation of the supply, the oil flows from the vent on the fuel tank in spurts and does considerable damage to buildings, shrubbery, walk, etc., before the operator can shut off his delivery. The loss of actual oil together with the damage done was usually of considerable extent.

One of the principal objects of my invention is to prevent waste and damage by providing a portable, self-contained telltale which is adapted to be connected to the vent pipe to catch the overflow, such telltale having an alarm which will be actuated at the first discharge of oil from the vent so that the operator will shut off the delivery.

Another object of my invention is to provide a telltale in the form of a portable container having a flexible hose for connecting an alarm actuated mechanism with the overflow vent of an oil tank, so that the alarm mechanism will be set in operation by the flow of liquid to the container from the overflow of a vent pipe, such container being of sufficient size to hold as much overflow as will be normally discharged before the operator can shut off his delivery of oil to the tank.

A further object of my invention is to provide a portable telltale having a closed alarm actuating and overflow receiving compartment to which a flexible hose extends, the hose having a quick attaching coupling adapted to be secured in fluid tight relation to the vent pipe of a tank, so that overflow may be conducted into the closed reservoir through a closed conduit and thereby kept free from inflammable contact.

Further objects and advantages of my invention will appear from the following disclosure thereof taken in connection with the attached drawings which illustrate a preferred embodiment of my invention and in which, Figure 1 is a perspective view of the portable telltale apparatus, Figure 2 is a top plan view of the telltale apparatus showing the hose in extended position and the top of the hose compartment open, Figure 3 is a front elevation of the telltale apparatus showing in dotted lines the interior construction, and with the louvers removed to display the alarm mechanism, Figure 4 is a vertical section taken substantially along the line 4—4 of Figure 3, Figure 5 is a horizontal section taken substantially along the lines 5—5 of Figure 4, Figure 6 is a vertical section taken substantially along the line 6—6 of Figure 5 and showing the operation of the flow detector, Figure 7 is an elevation of a part of the vent pipe and coupling with parts in section showing the manner of attachment, Figure 8 is a partial perspective view partly in section showing the arrangement of pouring baffles, and Figure 9 is a detailed vertical section taken substantially along the line 9—9 of Figure 8, showing the parts of the discharge baffle.

One form of embodiment of my invention which I find to be especially suitable for eliminating the objectionable overflow from tanks, such as fuel oil tanks due to the supply of too much oil, and which I refer to hereinafter as a telltale, may desirably be enclosed within a portable container 10 as shown in Fig. 1. For convenience and ruggedness, I prefer to make this container 10 of sheet steel, the corners of which are welded or otherwise secured to make a fluid tight reservoir as hereinafter described. Such a container is also conveniently provided with a hinged cover 12 having a suitable handle 14 by which it may be carried to and from its point of use adjacent the tank to be filled.

The container 10 may suitably be divided into several parts or compartments, the upper of which is generally designated at 16, and may be referred to as the conduit or hose compartment to receive a suitable length of hose 18, with a quick acting coupling 19 on one end, the other end of the hose being secured to coupling 20, secured in the bottom of the hose compartment 16. The quick acting coupling 19 is adapted to be secured to the vent pipe of the usual fuel oil tanks, which is normally exposed to the atmosphere outside of the building. In order to divert the overflow to the telltale 10, it is only necessary to have a short length of hose 18 so that it can readily be carried in the hose compartment 16.

The second and major part of the container 10 is the reservoir compartment 22, which takes up almost the entire portion of the container. The reservoir compartment, in addition to serving as a reservoir, has the alarm actuating mechanism as hereinafter described, such mechanism being actuated by the flow of oil through the hose 18 and the coupling 20 which opens into this compartment. This compartment is otherwise liquid tight except for a small discharge opening through which it may be emptied.

The alarm actuating mechanism which is carried in the reservoir compartment and is particularly shown in Figs. 4, 5 and 6 includes a flow detector member 28 in the path of the oil flow from the coupling 20 as directed by baffle 21. As shown in Fig. 6, the oil will spurt out of the coupling 20 when overflow through the vent commences, and it is desirable to know about the flow at once and to stop it. In one form of embodiment which I find to be satisfactory, the oil flow detector 28 is made in the shape of a receptacle which will hold some oil due to the rapid flow, although holes 28a in the bottom of the receptacle permit the receptacle to drain and return to non-alarm sounding position when the flow stops.

I find that a convenient way of determining the movement of such a flow detector 28 is to mount it on a shaft 30 in the manner of a seesaw, with a counterweight 32 to normally balance the empty receptacle. The rotation of the shaft 30 will therefore indicate the condition of flow, such shaft moving into alarm sounding position during a continued overflow, whereas it will rotate to alarm sounding position and out again if there is only an accidental spurt. This will only instantaneously operate the alarm, although continued flow will give a continued alarm. Such a flow detector is very simple in construction, requires no springs or other variable elements and is highly sensitive. Other flow detectors may be used, however, if desired.

The third compartment 24 in the container may conveniently be referred to as the alarm compartment and whereas the oil reservoir compartment was of necessity sealed tight to prevent escape of liquid, the alarm compartment 24 is desirably open to the atmosphere to provide for free passage of the alarm sounds. For this reason, I prefer to provide an open louver cover 26 to close this compartment and to render the alarm mechanism accessible. This compartment, however, is sealed with respect to the reservoir compartment so that there can be no danger of sparks or other ignition of the fuel oil carried in the reservoir.

The alarm mechanism carried in compartment 24 may be of any type suitable for warning the truck operator that the tank is full. Usually the pump on the truck makes so much noise that a loud signal is desired and, as heretofore pointed out, I prefer not only to give the warning at the point of overflow, but to stop the warning when the overflow stops. A sensitive warning signal which tells both conditions is best for the purpose I have in mind. For this reason, I find that a simple electric bell 40 of the door bell type is very satisfactory, and such bell may be energized by the typical batteries 38 in a suitable open circuit arrangement which includes the contacts 34 and 36. Preferably, one contact such as 36 is fixed and the other contact 34, which may be of spring type, is secured to the shaft 30, so that when it is rotated the alarm will be sounded. While I have referred above to alarm means as used in an illustrative embodiment of the invention, it is apparent that this contemplates any indicating means which will respond to overflow conditions either by giving a signal to the operator or otherwise.

The tank truck operator who desires to fill a fuel tank with oil normally attaches his filling hose to the fill pipe leading to the tank in the usual manner and, in order to avoid spills and overflows, he places the telltale 10 in a convenient position adjacent the vent pipe generally indicated at 42 in Fig. 7. The telltale hose 18 is then secured to the vent 42 as by the quick acting coupling 19, the hook 19a being hooked about the transverse pin or other projection 42a in the vent. The quick coupling is provided with a lever and nut 19b which will force the coupling and its gasket 19c against the open end of the vent into liquid tight contact therewith.

After the tank has become filled and overflow occurs the oil is conducted in leak proof relation through the coupling 20 into the telltale and, as diagrammatically shown in Fig. 6, the oil engages the flow detector 28 due to the position of the baffle 21. The sudden rush of oil will overbalance the weight 32 and give the operating shaft 30 such a rotation that the contacts 34 and 36, as shown in Fig. 3, are closed. This will in turn cause an alarm, so that the tank truck operator can stop the flow.

For convenience, I make the reservoir compartment 22 of substantial size so that it will hold a rather large amount of liquid. I estimate that under normal circumstances, an operator can shut off his tank rather quickly but to be on the safe side, the compartment 22 is adapted to hold about six gallons of oil, which will take care of all the oil that would normally be discharged under emergency conditions. The oil drains from the receptacle 28, as hereinbefore mentioned, into the reservoir 22, and the flow detector automatically returns to non-alarm position.

After the fuel tank has been filled the quick acting coupling 19 may be released, and then I may turn the telltale on edge, as shown in Fig. 8, so that the oil can be discharged through the opening 45 and past the baffles 44. The baffle 44 satisfactorily prevents accidental escape of oil and makes it convenient to pour the liquid from the receptacle. The hose is then replaced in the hose compartment 16, the cover 12 closed and the telltale replaced on the truck.

I find that by such a device, I not only eliminate all spilling or accidental overflow which heretofore has tended to spray all over grass, shrubbery, and the buildings and resulted in considerable expense and loss to the liquid dispensing company, but I am able to make deliveries more rapidly, and I can fill the tank without repeatedly taking time to inspect the filling operation. The device is very easily carried and accomplishes in a very satisfactory manner the warning of the tank truck operator that the tank is filled. Furthermore it is not inadvertently operated by any discharge of air, as the receiving compartment 22 is open at the point 45 which acts as a vent.

While I have shown a preferred form of embodiment of my invention, I am aware that other modifications may be made thereto and I therefore desire a broad interpretation of my invention within the scope and spirit of the description herein and of the claims appended hereinafter.

I claim:

1. A portable overflow detector of the class described, comprising a container having a hose receiving compartment, a reservoir for receiving overflow and an alarm compartment having an alarm therein, means in the hose compartment detachably connectible to a source of overflow to conduct liquid into the reservoir compartment and means in the reservoir compartment responsive to the flow of liquid therein to operate the alarm.

2. A portable container of the class described comprising a hose compartment having a flexible hose therein, a quickly acting coupling on one end of said hose and adapted to be secured to a tank vent pipe, a reservoir in communication with the other end of said hose, an alarm means in said container, means to operate said alarm mechanism by liquid passing through said hose and means to stop the operation of said alarm mechanism when flow through the hose stops, and means to enable discharge of the liquid from said reservoir after the tank has been filled.

3. A portable overflow detector unit of the class described comprising an alarm means, a flow detector, vapor tight means detachably connectible to a source of overflow to convey liquid overflow to said flow detector, and a reservoir to collect such overflow, said flow detector comprising means responsive to contact by said liquid overflow for operating said alarm means.

4. In the filling of fuel tanks of the class described, portable protector means to avoid damaging overflow from such tanks which comprises a conduit, a detachable coupling at one end of said conduit to be secured to a tank outlet, a container comprising a reservoir in communication with the other end of said conduit, an alarm means and a flow detector including means responsive to overflow liquid in said container for energizing said alarm means, said flow detector comprising a counterbalanced arm having a receptacle in position to receive liquid issuing from the last mentioned end of said conduit and movable under the weight of such liquid, said receptacle having means for draining liquid therefrom, whereby it will move to a de-energizing position after the flow of liquid thereto ceases.

5. A portable alarm unit of the class described comprising a flexible conduit, a quickly detachable coupling at one end of said conduit adapted to be secured to a tank vent pipe, a container comprising a reservoir in communication with the other end of said conduit, an alarm means and means for operating said alarm means in response to liquid issuing from said conduit, including means for stopping the operation of said alarm means when said flow ceases.

6. In combination with a tank to be filled with fluid, said tank having a vent pipe, portable means to warn of overflow of said vent pipe which comprises a flexible conduit embodying means at one end thereof connectible to the tank vent, a flow detector means adjacent the other end of said conduit and responsive to the flow of a small quantity of liquid from said conduit, an alarm means to indicate the flow of liquid to said flow detector means, alarm sounding means connecting with said flow detector means and responsive to movement of said flow detector to actuate said alarm means and a relatively large reservoir to collect overflow.

7. A portable overflow detector unit of the class described comprising an overflow indicating means, a flow detector, means detachably connectible to a source of overflow to convey liquid overflow to said flow detector and means to collect such overflow, said flow detector comprising means responsive to contact by said liquid overflow for actuating said overflow indicating means.

IVOR FRANCIS HENSLER.